April 14, 1953     A. A. HOPEMAN, JR., ET AL     2,634,429
COMBINED FOLDING BED AND SEAT
Filed Oct. 28, 1946     6 Sheets-Sheet 1
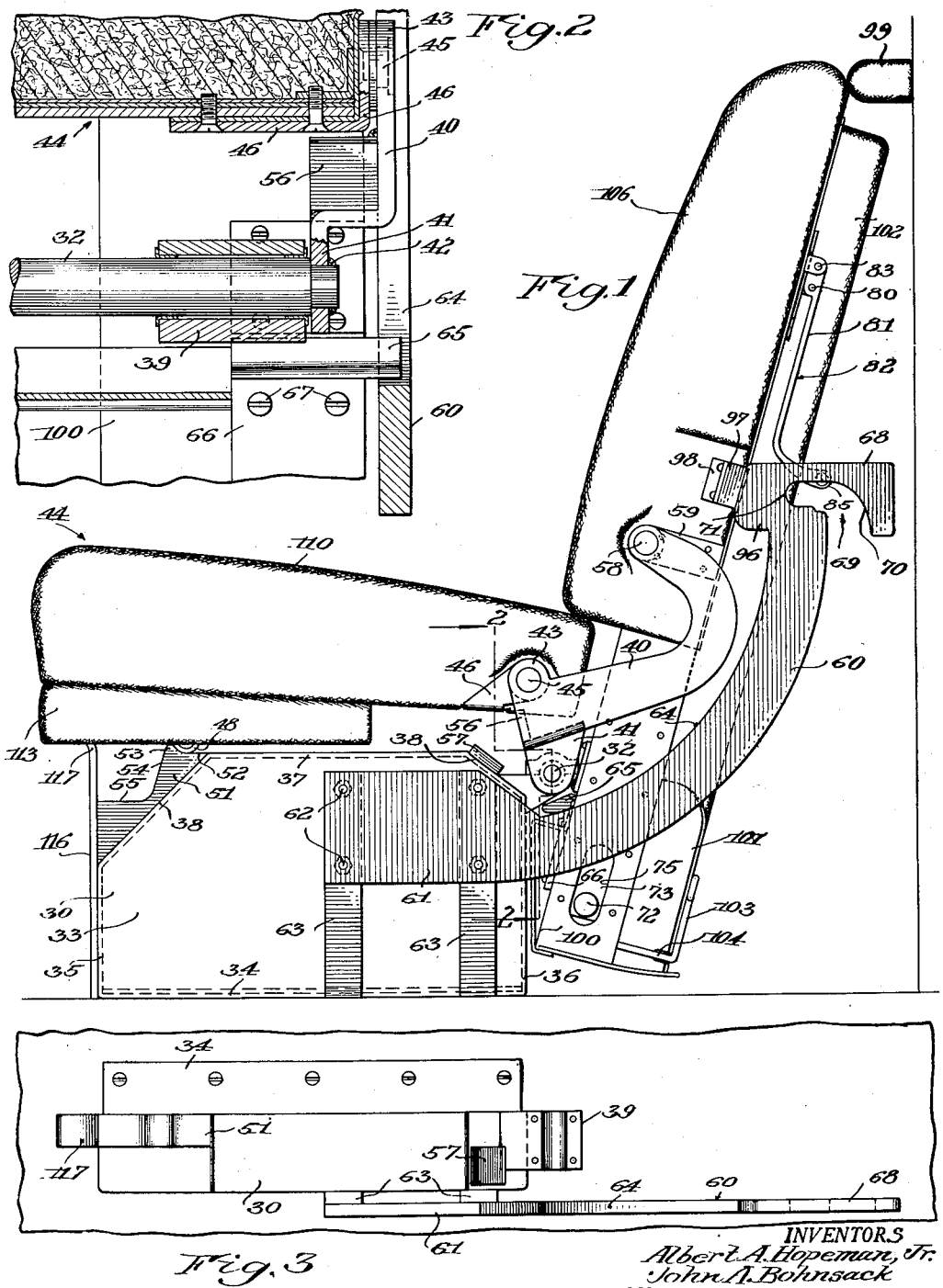
INVENTORS
Albert A. Hopeman, Jr.
John A. Bohnsack
BY Edward S. Lumpston
their Attorney April 14, 1953     A. A. HOPEMAN, JR., ET AL     2,634,429
COMBINED FOLDING BED AND SEAT
Filed Oct. 28, 1946     6 Sheets-Sheet 2
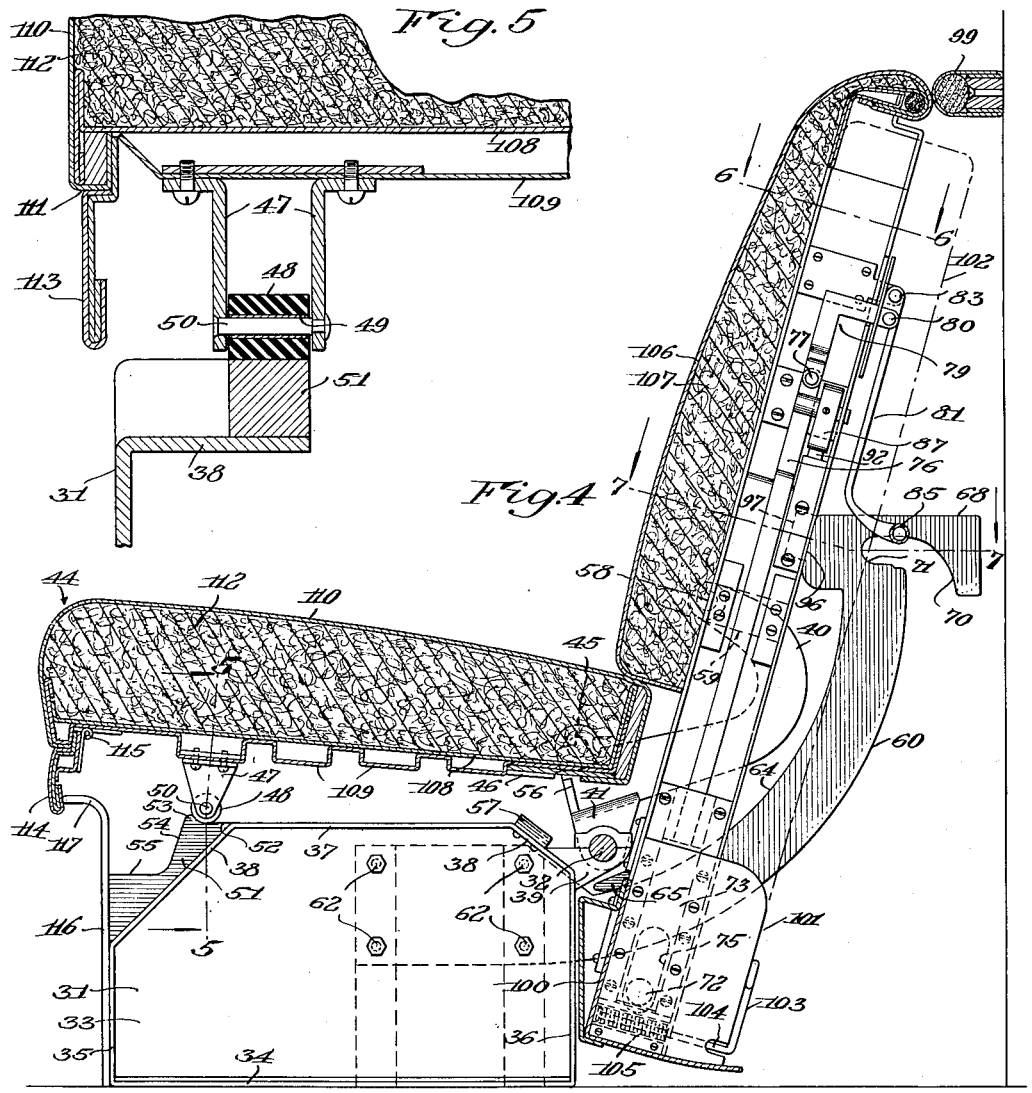
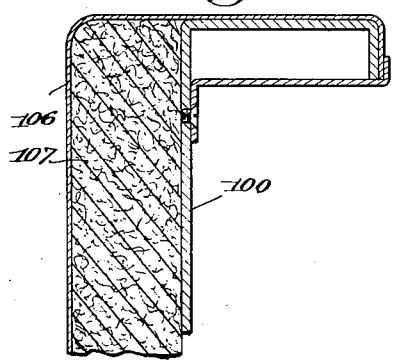
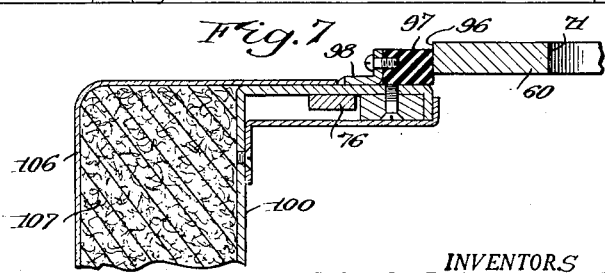
INVENTORS
Albert A. Hopeman, Jr.
John A. Bohnsack
BY
Edward H. Cumpston
Their Attorney

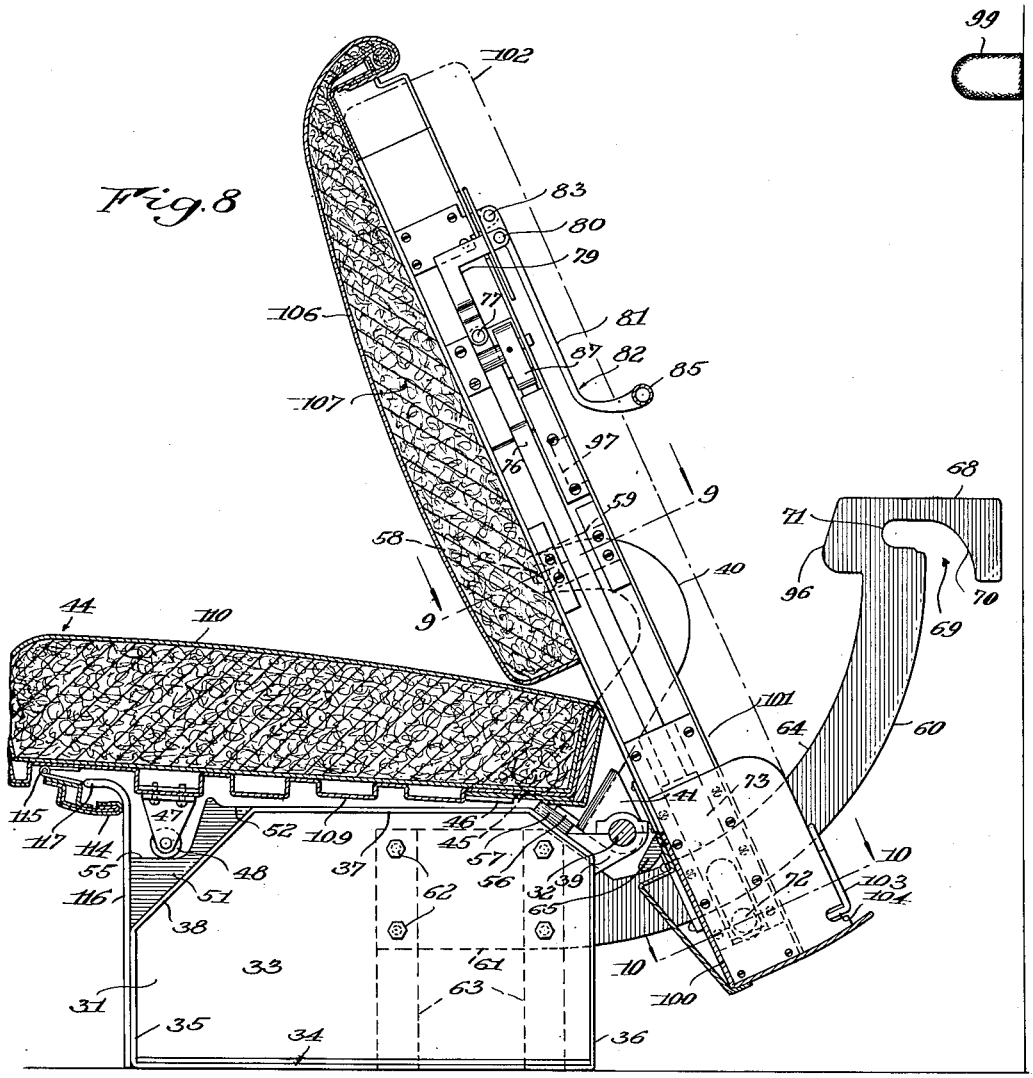
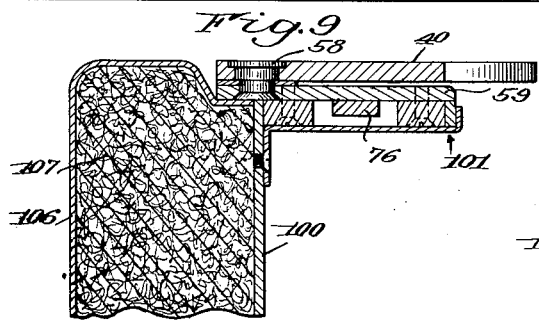
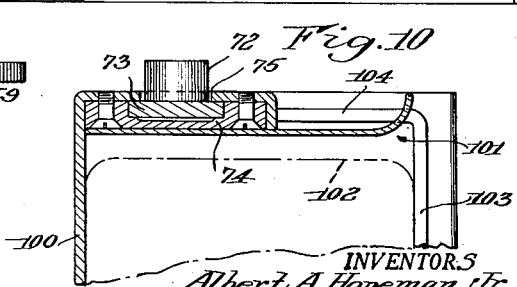

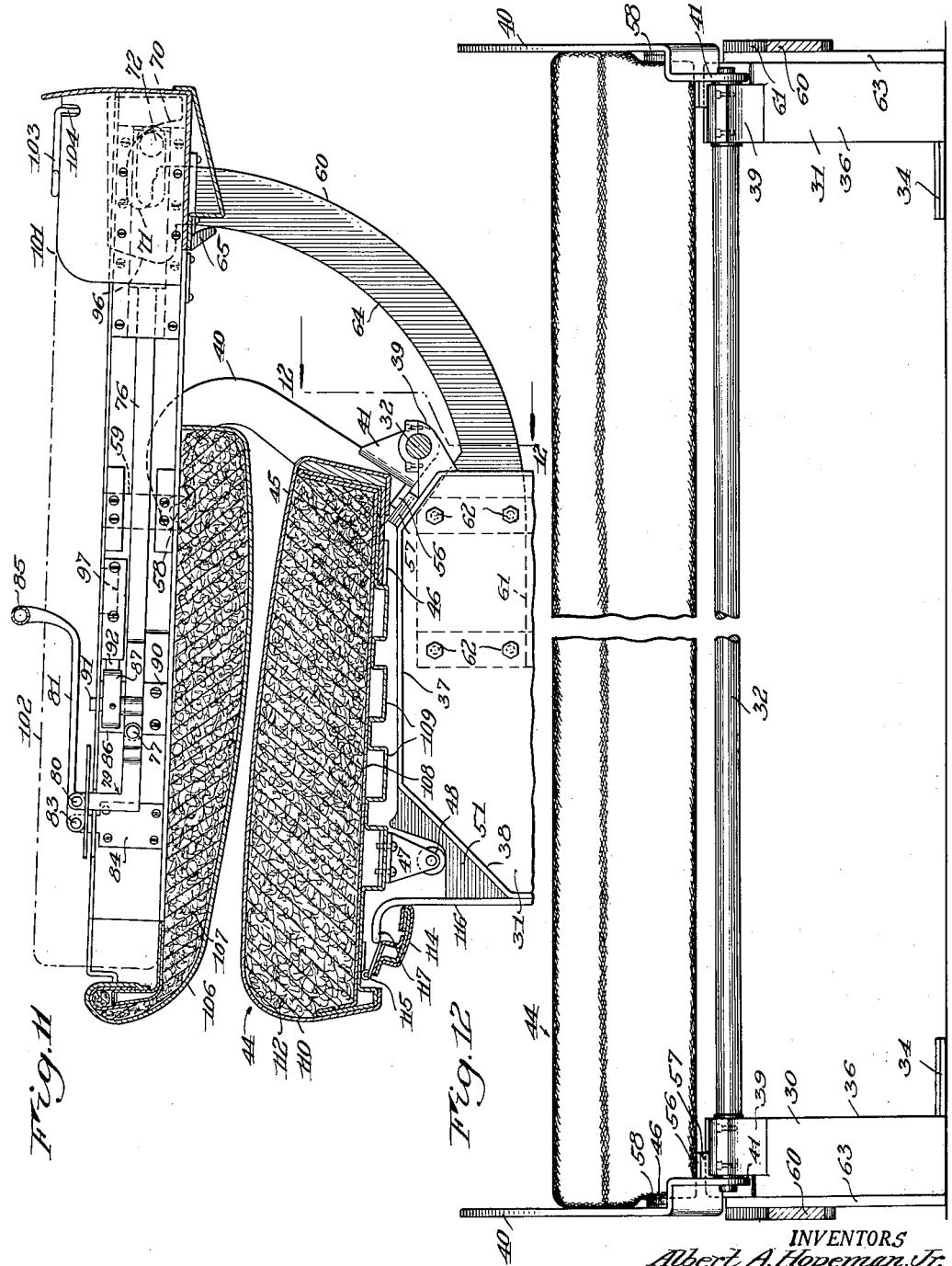

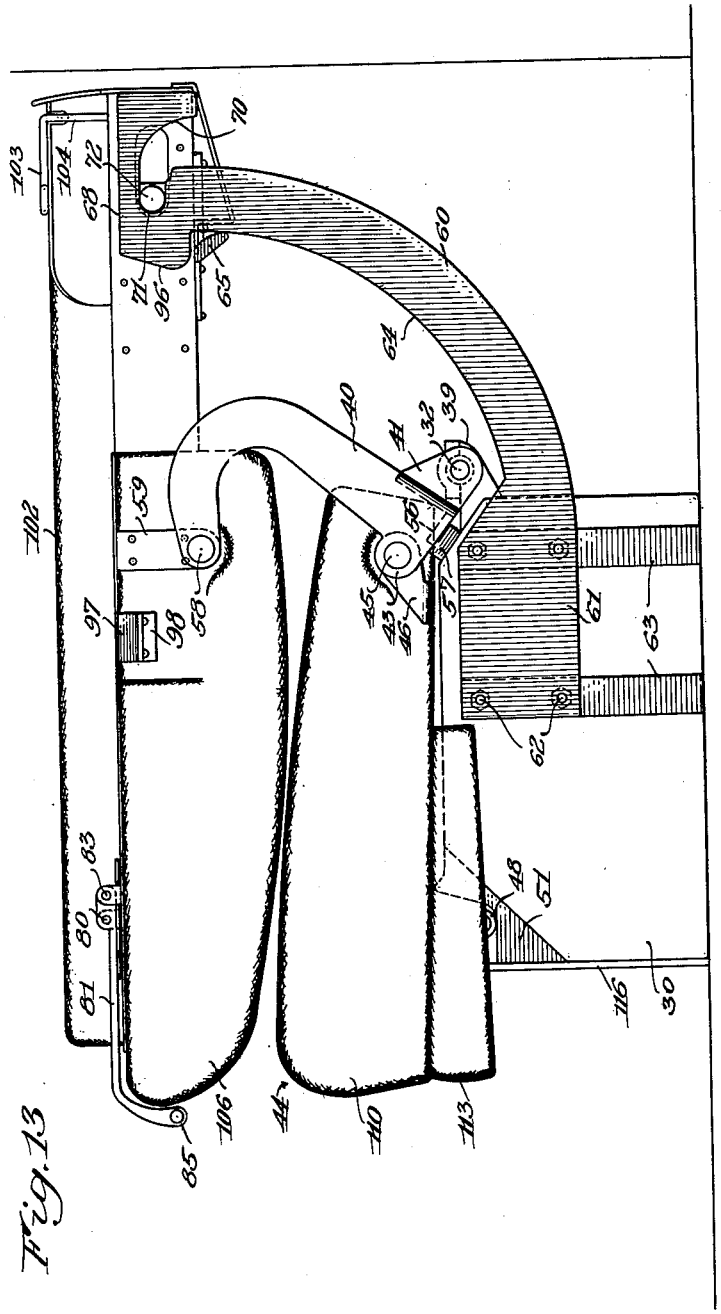

April 14, 1953 A. A. HOPEMAN, JR., ET AL 2,634,429
COMBINED FOLDING BED AND SEAT
Filed Oct. 28, 1946 6 Sheets-Sheet 6
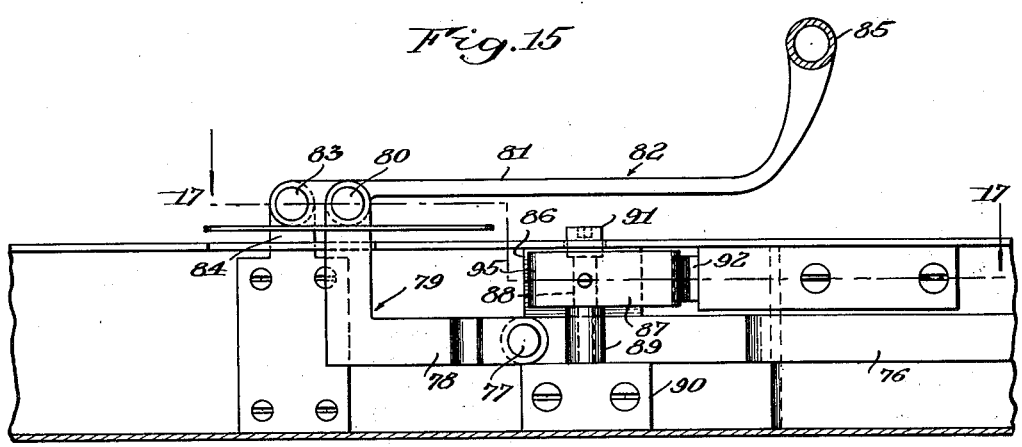
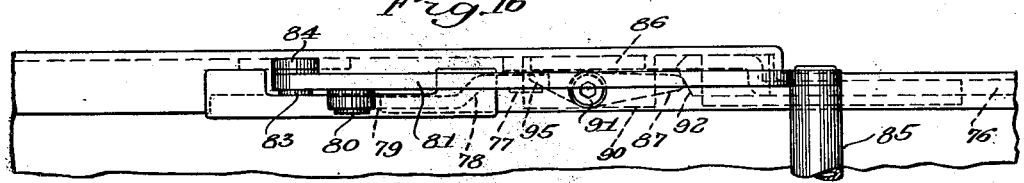
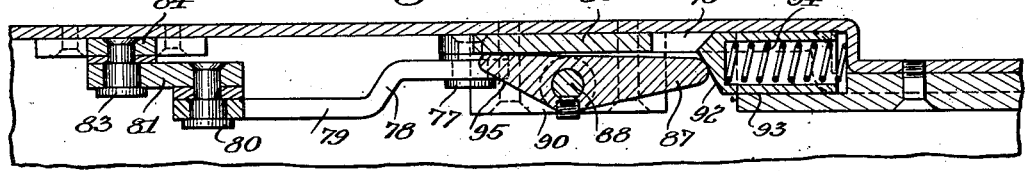
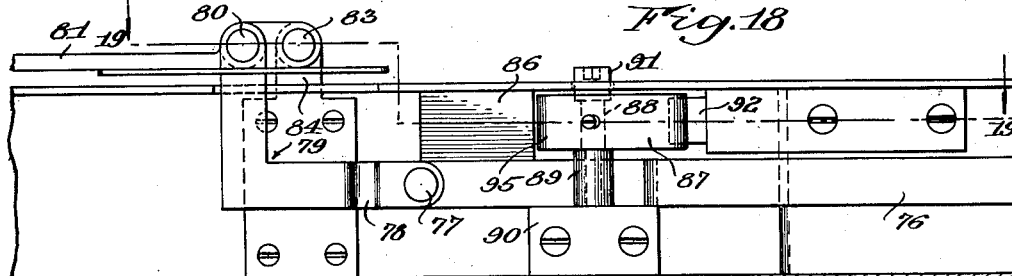
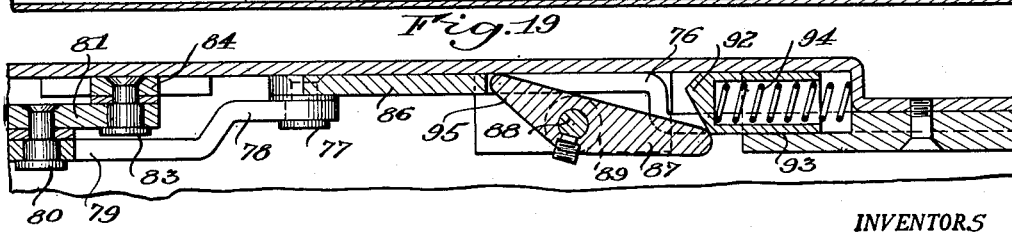
INVENTORS
Albert A. Hopeman, Jr.
John A. Bohnsack
BY Edward H. Cumpston
their Attorney Patented Apr. 14, 1953

2,634,429

UNITED STATES PATENT OFFICE 2,634,429

COMBINED FOLDING BED AND SEAT

Albert A. Hopeman, Jr., and John A. Bohnsack, Waynesboro, Va., assignors to Hopeman Bros., Inc., New York, N. Y., a corporation of Delaware Application October 28, 1946, Serial No. 706,182

20 Claims. (Cl. 5—43)

This invention relates to combined folding beds and seats of the variety adapted to be used either as a seat with the bed folded to position to serve as a seat back, or as a bed with the bed frame lowered to open position overlying the seat. One object of the invention is to provide an improved bed and seat of the above character for use in marine staterooms, railway cars, and bedrooms generally, having a more simple, compact, and efficient construction adapted to be conveniently adjusted from one position of use to the other.

Another object is the provision of such a bed and seat supported by floor pedestals independently of any wall or bulkhead panels, seat arms, or other supports for the mechanism, so as to allow freedom of choice and design in associating the ends of the bed and seat with a seat arm, plain or upholstered, or with a bulkhead panel, car wall, or the like.

Another object is to supply mechanism of the above nature in which the center of gravity of the bed is located at about the same height in either raised or lowered position, so as to practically obviate the lifting of the bed in its motion from one position of use to the other and facilitate its adjustment with a minimum of exertion.

Another object is to provide a combined folding bed and seat in which the bed has a minimum movement from one position to another so as to occupy a minimum amount of space.

A further object is to afford a mechanism having the above advantages in which the bed and seat are securely retained in position for use as a seat by the weight of the parts and of the occupant and in which they are unavoidably and securely locked against movement when lowered to position for use as a bed.

Still a further object is to provied a mechanism of the above character in which the seat is automatically lowered to permit the lowering of the bed to the most convenient height from the floor, without substantially obstructing the storage space under the seat.

To these and other ends the invention resides in certain improvements and combinations of parts, all as will be hereinafter more fully described, the novel features being pointed out in the claims at the end of the specification.

In the drawings:

Fig. 1 is an end elevation of a combined bed and seat embodying the present invention, with the parts raised to position for use as a seat;

Fig. 2 is an enlarged fragmentary sectional elevation substantially on the line 2—2 in Fig. 1;

Fig. 3 is a top plan view of one of the supporting end frames shown in Figs. 1 and 2;

Fig. 4 is a view similar to Fig. 1 but showing portions broken away and partly in section to better disclose the mechanism;

Fig. 5 is an enlarged sectional elevation on the line 5—5 in Fig. 4;

Fig. 6 is an enlarged sectional plan on the line 6—6 in Fig. 4;

Fig. 7 is a similar view on the line 7—7 in Fig. 4;

Fig. 8 is a view similar to Fig. 4, but showing the bed swung partly down toward open position;

Fig. 9 is a sectional plan view on the line 9—9 in Fig. 8;

Fig. 10 is a similar view on the line 10—10 in Fig. 8;

Fig. 11 is a view similar to Fig. 8, but showing the bed further lowered to approximately open position but before being locked;

Fig. 12 is a sectional elevation substantially on the line 12—12 in Fig. 11;

Fig. 13 is an end elevation showing the bed in fully lowered and locked position;

Fig. 14 is an elevation of one end of the bed frame positioned as in Fig. 13, but with portions removed to more clearly disclose the mechanism;

Fig. 15 is an enlarged elevation of an end portion of the bed frame showing the locking device in unlocked position;

Fig. 16 is a top plan view of parts shown in Fig. 15;

Fig. 17 is an enlarged sectional plan view substantially on the line 17—17 in Fig. 15;

Fig. 18 is a view similar to Fig. 15 showing the parts in locked position, and

Fig. 19 is an enlarged sectional view substantially on the line 19—19 in Fig. 18.

The embodiment of the invention herein disclosed, by way of illustration, comprises, preferably, a main supporting frame provided by a pair of spaced end frames 30 and 31, Figs. 1 and 12, connected in properly spaced relation by a main shaft 32 on which the mechanism is mounted for movement as hereafter more fully described. Each end frame is preferably constructed as a steel or aluminum casting, comprising a vertical wall portion 33, a bottom or base flange 34, end flanges 35 and 36, a top flange 37 and inclined top corner flanges 38, affording a stiff and rigid structure. With these end frames positioned in parallel relation and properly spaced from each other and from any wall or bulkhead panel at the rear thereof, the frames are preferably secured in position by merely screwing or bolting the base flanges to the floor, without connection with or alteration of any adjoining bulkhead or wall.

Each frame has welded, or otherwise integrally associated therewith, adjacent its top, a rearwardly extending bracket 39 carrying a bearing in which the main shaft 32 is supported for rocking movement, these bearings being mounted on the inwardly projecting top flanges 38 so as to be located out of the way at the inner sides of the frames.

The bed and seat frames are constructed as hereafter more fully described and are movably supported on pivoted members or brackets 40, Figs. 1, 12, and 13, preferably in the form of arms of substantially gooseneck shape as shown, made from steel plates, each having a bottom extension 41 welded or otherwise fixed on one end of main shaft 32, as at 42, Fig. 2, outwardly of the shaft bearings 39, for rocking movement with the shaft. Each member or bracket 40 has at its base an opposite extension 43 movably connected with the seat frame which is indicated generally at 44, as by means of a pivot stud 45 fixed in a bracket 46 secured by screws to the bottom of the seat frame at each of the ends thereof. The inner corners of the seat frame are thus pivotally supported by the pivoted brackets 40.

Each end of the seat frame is provided adjacent its outer side with a pair of spaced bearing brackets 47, Figs. 4 and 5, secured thereto by screws and carrying between their outer ends a rubber roller 48 mounted on a brass sleeve 49 rotating on a pin 50 fixed at opposite ends in the brackets. Each roller 48 rests on a cam shaped bar 51 fixed on the corresponding end frame and having at its top a flat portion 52 on which the roller rests when the seat is in its upper position for use as such. The forward end of each portion 52 of the cam bar has a high point 53 beyond which is a downwardly and outwardly inclined cam face 54 terminating in a second flat portion 55. It is evident from this construction that as members or brackets 40 are rocked with the bed on the main shaft 32, they act through their pivotal connections with the seat frame to transmit to it an outward movement which causes rollers 48 to ride up over the high points 53 of the cam bars by slightly lifting the forward side of the seat. Thereafter the rollers travel down the inclined portions 54 and come to rest on the outer flat portions 55, with the seat moved outwardly and downwardly to the position shown in Figs. 8 and 13 in which it is lowered out of the way of the combined seat back and bed in the lowered position of the latter. The brackets 40 and the seat frame are arrested in this position by the engagement of flanges 56 on the brackets with cushioning rubber stop blocks 57 fixed on the top flanges 38 of the end frames.

Each member or bracket 40, above its base, is of generally "goose neck" shape, as shown, and its forwardly turned upper end is movably or pivotally connected with a stud 58, Figs. 1 and 9, fixed in a block 59 fixed in turn at about the mid portion of the corresponding end of the bed frame, this pivotal connection being generally similar to the pivotal connection with the seat frame described above. It is evident from this construction that the seat back and bed frame are pivotally supported on the brackets 40 and through them on the main shaft 32, so as to have a pivotal movement relative to the brackets and also a pivotal movement together with the brackets about the main shaft.

Means are provided for controlling the movement of the bed frame so as to cause it to pivot successively about these two axes of pivotal support, such means comprising preferably a fixed cam plate 60, Figs. 1, 2, and 3, having its lower end 61 fixed as by means of bolts 62 to the vertical walls of the end frames 30 and 31, reinforced by a pair of vertically extending bars 63 secured between each cam plate and the frame and extending down to the base of the frame, as shown. Each cam plate has a rearwardly and upwardly extending arm, the upper cam edge 64 of which is curved on an arc concentric with the center of pivotal connection of the bed frame with the bracket 40 in the forward position of the latter, as shown in Figs. 8 and 13. Cooperating with these cam surfaces are followers or lugs 65, Figs. 1 and 2, carried by plates 66 secured as by means of screws 67 to the bottom of the bed frame at each end thereof, the lower side of each lug being somewhat curved and positioned to ride smoothly in contact with the cam surface 64 during rocking movement of the bed frame with the brackets 40 and the main shaft 32. Contact of the lugs with the cam surface during such movement obstructs rotation of the bed frame about its pivotal connections with the brackets and so forces the frame and brackets to rock together as a unit, while also moving the seat frame.

It is evident from this construction that when the top of the bed frame is pulled forwardly from the position shown in Fig. 1, to lower it, it is forced by such cam control means to act as a lever for rocking the brackets forwardly to the position shown in Fig. 8 in which they strike and are arrested by the rubber stop blocks 57. In that position, however, the pivotal connections between the frame and brackets lie at the center of curvature of the cam surface 64, so that the bed frame may then be swung forwardly about such pivotal connections with the brackets, its lug 65 following smoothly along the cam surface until the bed frame reaches the position shown in Fig. 11 slightly short of its final horizontal position. Further and final movement of the bed frame is then effected by means for locking it in final or lowered position and such means will now be described.

The means for locking the bed in lowered position are located mainly on the ends of the bed frame and the upper rear ends of the cam arms 60 of the main supporting frame. For this purpose the cam arms terminate in an enlargement or head 68, Fig. 1, into which is cut a cam slot 69 having a curved entrance portion 70 and a semicircular inner end 71. Cooperating with each slot is a trunnion like follower 72, Figs. 1, 10, and 14, fixed on a bar 73 sliding longitudinally in a guideway 74 in the channel-shaped end of the bed frame, the outer side of the frame being slotted as at 75 to permit such reciprocating movement of the follower 72. The bar 73 carrying each follower is reduced in width as at 76 and extends within the end of the bed frame, Figs. 9 and 14, adjacent the upper or outer side of the frame where each bar is pivotally connected as at 77, Figs. 14 to 19, inclusive, with one end 78 of a link 79 the other end of which is pivotally connected at 80 with one of the arms 81 of a bail-shaped member 82 having the ends of its arms pivoted at 83 on bracket 84 on the ends of the frame.

The arms of the bail-shaped member 82 at opposite ends of the bed frame have their other ends curved and connected by a handle rod or bar 85, Figs. 4 and 15, which, in the raised and unlocked position extends lengthwise of the bed above the center of the mattress in position to obstruct occupancy of the bed so long as the bar is in such unlocked position. However, after the bed has moved to the substantially lowered position of Fig. 11 the bar is pulled outwardly over the outer side of the bed frame so as to lie, out of the way, below the mattress as shown in Fig. 13. Such movement of the locking handle 85 slides the bars 73—76 longitudinally, thereby pulling the followers 72 into the inner ends 71 of the cam slots 69 in the upper ends of the cam arm 60 described above. The followers are preferably made to closely fit the cam slots so as to draw the bed frame down into its final lowered position and tightly lock it against movement, vibration or rattle.

Means are provided for additionally securing the bed or berth against movement from its lowered position, either by the application of inadvertent force by an occupant or the roll of a ship, such means being arranged to require intentional operation independently of the operation of the locking handle 85. This means preferably comprises a plate 86, Figs. 15 to 19, inclusive, fixed on the bar 76 to extend thereabove adjacent its connection with the operating link 79. Plate 86 reciprocates with the bar between a latch member 87 and one side of the end of the bed frame. The latch member is fixed on a pin 88 mounted to rock in a bearing 89 in a block 90 on the bed frame, the opposite or upper end of the pin being provided with a knurled knob 91 projecting through an opening in the side of the bed frame and adapted for manually rocking the pin and the latch member. One end of the latch member bears against the wedge-shaped end 92 of a hollow plunger sliding longitudinally in a bearing 93 formed in the bed frame. A coiled compression spring 94 within the plunger tends to press it outwardly to engage and swing the latch member at its opposite end 95 into the path of movement of the reciprocating plate 86. When this plate is moved toward the left by movement of the handle bar 85 to lock the bed, it passes beyond the end of the latch member 87 which is then forced by its spring plunger in front of the plate, as shown in Figs. 18 and 19, thereby obstructing return of the plate and holding the locking means in locked position until knob 91 is intentionally operated to swing the latch member back to inactive position and free the locking mechanism for unlocking the bed. The knob 91 may obviously have any convenient size or shape and may be adapted, if desired, for engagement by a wrench, key or other tool, such particular details of the knob forming no part of the present invention.

For additionally supporting the bed frame in its raised or closed position and cushioning its movement, the upper end of each cam arm 60, Fig. 1, is formed with a forwardly projecting stop portion 96 for engagement with a block 97 of rubber, or other suitable cushioning material secured to a bracket 98 fixed on each end of the bed frame. Such engagement of these blocks with the fixed cam arms affords, in combination with the pivotal supports on the members or brackets 40, two spaced points of stable support for each end of the frame. A suitable cushioned rib 99 is preferably fixed to the adjacent wall or bulkhead panel at the top of the frame in its raised position, as shown, to close the top of the space behind the bed or berth, the meeting surfaces of this rib and of the frame being rounded, as shown, to eliminate any likelihood of pinching the fingers between these parts in raising the bed.

The bed frame may have any known or suitable frame construction comprising preferably a main wall 100 of steel or aluminum plate provided on one side with flanges indicated generally at 101, so as to form a receptacle or pan for receiving and retaining the bed or berth mattress 102. These flanges at the ends of the bed have a somewhat varying construction to form channels for enclosing and guiding the locking bar 76 and for reinforcement, including stiffening bars at points of imposed stresses, as shown in Figs. 6, 7, 9, and 10. As a means of holding the mattress in place in the raised position of the pan there is provided, in addition to the handle bar 85, a "hold-down" rod 103, Fig. 4, at each of the lower corners of the frame. Each rod 103 has a portion 104 slidably guided in openings in the wall of the pan, the lower opening being in a housing for a coiled compression spring 105 confined between the housing and the end of the rod. The outer end of the rod is turned parallel with the top of the mattress against which it is held by spring 105, the rod being movable outwardly and rotatable to clear the mattress space to permit the insertion and removal of the mattress.

The opposite side of the bed frame is cushioned to serve as a back rest when the parts are positioned for use as a seat, comprising preferably a covering 106 of known or suitable material having its edges cemented or otherwise attached to the flanges of the mattress pan. The space between this covering and the main wall 100 of the frame is filled with any known or suitable padding material 107, with or without the known upholstery springs (not shown), as well understood in the art, the whole being suitably shaped to conform to and comfortably support the back of an occupant of the seat.

The seat frame may have any known or suitable construction comprising preferably a main or bottom wall 108, Figs. 4 and 5, of aluminum or steel plate ribbed longitudinally as at 109 for reinforcement, the points of support, namely, the pivotal connections with brackets 40 and the roller brackets 47, being fixed to this bottom wall, as shown. This seat frame is cushioned by a cover 110 cemented or otherwise secured at its edges to the frame as indicated at 111, Fig. 5. The space between covering 110 and the bottom 108 of the frame is filled with any known or suitable packing material 112, with or without the known springs (not shown), as well understood in the art.

The forward portion of the ends of the frame are preferably provided with fixed depending aprons 113, Figs. 1 and 5, to conceal the mechanism and enhance the appearance. To the same end the outer side of the seat is provided with a movably depending apron 114, Figs. 4 and 8, secured to the under side of the seat frame by means of a spring hinge 115 tensioned to fold the apron inwardly and upwardly against the bottom of the seat. However, the forward end of each of the supporting frames 30 and 31 carries a vertical bar 116 having a forwardly curved upper end 117, Figs. 3, 4, and 8. When the seat is moved upwardly and rearwardly to its elevated position of use, end 117 of the bar pushes the apron downwardly to serve the same purpose as the end aprons 113, but when the seat is moved forwardly and downwardly during the lowering or opening of the bed, apron 114 is swung upwardly by its spring hinges under the bar ends 117, to better clear the space under the seat for the storage of baggage or other articles.

The operation of the parts is evident from the above description of their construction. With the parts arranged for use as a seat, as shown in Fig. 1, in order to convert them for use as a bed, the top of the bed frame is pulled forwardly, pulling with it the brackets 40 which all rock together with the main shaft 32 in its bearings on the end frames. During such movement, engagement of the follower lugs 65 with the cam surfaces 64 restrains the movement of these parts to rotation about the axis of the main shaft, the bed frame acting somewhat as a lever to effect such movement of the brackets 40 and shaft. Such movement automatically pushes the seat frame forwardly and downwardly, to move it out of the way of the descending bed. At the end of this stage of the movement, the flanges 56 of the brackets strike the cushioning stop blocks 57, arresting further movement of the shaft, brackets and seat frame. At this point also the axis of pivotal support of the bed frame on the brackets is positioned at the center of curvature of the cam surfaces 64, so that the bed frame may then be swung about these pivotal connections as the follower lugs 65 move along the cam surfaces, to the position of the parts shown in Fig. 11.

In this substantially lowered position of the bed, the lock handle 85 lies lengthwise of its center, so as to obstruct its occupancy until the handle is swung outwardly and downwardly to a position below the forward side of the bed, as shown in Fig. 13. Such movement of the handle not only clears the surface of the bed but draws the locking followers 72 into the inner ends of the cam surfaces 69 of the cam arms 60, camming the bed frame precisely to its final horizontal position and locking it against movement. During such locking movement of the handle 85, the plate 86, Fig. 19, is moved from behind the latch 87 which is then moved by its spring plunger 93 to dog the plate 86 and handle 85 in locked position. In such position of the parts the handle may be safely pressed, or grasped by an occupant of the bed or berth, inadvertently or to assist in moving from one position to another, or as a support during rolling of a ship, without danger of disturbing the lock which can only be released by intentional operation of the latch knob 91, thus doubly insuring the locking of the bed under all conditions.

To restore the parts to position for use as a seat, the latch knob 91 is operated to release the lock handle 85 which is then swung upwardly and rearwardly over the center of the mattress. With the hold-down rods 103 turned across the inner corners of the mattress to further secure it in the pan, the bed frame is pushed upwardly about the axis of its pivotal connections with the members or brackets 40, to the position shown in Fig. 8. Continued raising of the bed then moves it, together with the brackets, about the axis of the main shaft, and simultaneously pulls the seat upwardly and rearwardly to its elevated position for use. Such raising movement of the parts is finally brought to a cushioned stop by engagement of the rubber blocks 97 with the upper ends of the cam arms 60.

It is evident, furthermore, that the mechanism drops the inner side of the mattress practically to the floor level when in use as a seat, so as to lower the opposite or upper side of the mattress substantially to the level of the top of a normal seat back, thus permitting the use of a wide mattress. This is accomplished by supporting the bed frame for movement successively about spaced axes, as described above, facilitated by the simultaneous lowering of the seat. This successive movement of the bed frame, first about an axis adjacent its inner side and then about an axis adjacent its center, permits of its movement from one position to another with a minimum requirement of space. At the same time, it is unnecessary to provide counterbalancing means for the parts since the center of gravity of the bed frame in both of its positions is at approximately the same distance from the floor, with a minimum of lifting of its weight from one position to the other, while the leverage of the bed frame and brackets provides a mechanical advantage in the movement of the seat. When positioned for use as a seat, the angle of the cams 51, as well as the weight of the seat and its occupant, make it practically impossible for the bed to fold downwardly, and when positioned for use as a bed, the parts are doubly locked in place.

In view of the ease with which the bed can be swung from one position to another, without removing the mattress from its pan, and the accessibility of the mattress and coverings in lowered position, the bed can be operated and made up by a passenger or other unskilled person without requiring the aid of a railway porter or a ship steward. And while the above described features afford a mechanism particularly suitable for use in rolling ships and railway cars, it is evidently adapted to be used advantageously in other bedrooms and especially those of restricted space. In fact, the combination with a seat of the sofa or davenport variety in a compact and clean-cut type of design, makes the equipment suitable for use as living room furniture.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. A combined bed and seat comprising a supporting frame, a seat movable on said frame and having a position of use and a lowered position of non-use, a bed, supporting means movably connected with said frame and bed and having the connection thereof with said bed arranged for movement substantially above the connection thereof with said frame, means for effecting a first movement of said bed and supporting means together about the connection of said supporting means with said frame to move said bed at a substantially uniform elevation and a second movement of said bed relative to said supporting means about said connection therewith while said supporting means is stationary on said frame, for moving said bed successively about different connections during movements thereof between raised and lowered positions above said seat, and a connection between said supporting means and seat for simultaneously moving said seat between said position of use and said lowered position.

2. A combined bed and seat comprising a supporting frame, a seat movable on said frame and having a position of use and a lowered position of non-use, a bed, supporting means movably connected with said frame and having a movable connection with said bed adjacent the center of gravity of said bed to counterbalance the weight thereof in movement about said connection, control means for effecting one movement of said bed with said supporting means about the connection of said supporting means with said frame and another movement of said bed relative to said supporting means about said connection of said supporting means with said bed for moving said bed successively about different connections during movements thereof between raised and lowered positions above said seat, and a connection between said supporting means and seat for moving said seat from said position of use to said lowered position and return as said bed is lowered and raised, respectively.

3. A combined bed and seat comprising a supporting frame, a seat movable on said frame and having a position of use and a lowered position of non-use, a bed, supporting means movably connected with said frame and bed and having the connection thereof with said bed arranged for movement substantially above the connection thereof with said frame, said supporting means having its connection with said bed located adjacent the center of gravity of said bed to counterbalance the weight thereof in movement about said connection, control means for effecting one movement of said bed with said supporting means about the connection of said supporting means with said frame and another movement of said bed relative to said supporting means about said connection of said supporting means with said bed for moving said bed successively about different connections during movements thereof between raised and lowered positions above said seat, and a connection between said supporting means and seat for moving said seat from said position of use to said lowered position and return as said bed is lowered and raised, respectively.

4. A combined bed and seat comprising supporting frame means, a seat movable on said frame means, a bed, a member having movable connections with said frame means, seat and bed, said member being connected with said bed adjacent the center of gravity thereof and substantially above the connection of said member and frame, stationary cam means on said frame means, and a follower on said bed cooperating with said cam means, said cam means having one portion shaped and located to cooperate with the follower to effect one movement of said bed with said member about the connection of said member with said frame means, for moving said seat and said member, said cam means having another portion concentric with the connection between said bed and member at the end of said one movement for releasing said bed for another movement relative to said member about said connection therewith for moving said bed successively about different connections during movements thereof between raised and lowered positions above said seat while maintaining the center of gravity at a substantially constant elevation.

5. A combined bed and seat comprising supporting frame means, a seat movable on said frame means, a bed, a member mounted to rock about a stationary pivotal axis on said frame means and having movable connections with said seat and bed, said member being connected with said bed adjacent the center of gravity thereof and substantially above the connection of said member and frame, cooperating stop parts connected with said frame and member, cam means on said frame having a contour eccentric to said connection between said member and bed in the closed position thereof and a follower on said bed for cooperation with said cam means for controlling the movements of said bed and member so that said bed has one movement to partially lowered position with said member about said axis for engaging said stop parts for stationarily positioning said member and moving said seat, and another movement about said connection with said member while said member is stationary for moving said bed successively about different connections during movements thereof between raised and lowered positions above said seat and maintaining the center of gravity of said bed at a substantially constant elevation.

6. A combined bed and seat comprising supporting frame means, a seat movable on said frame means, a bed, a member mounted to rock about a stationary pivotal axis on said frame means and having pivotal connections with said seat and bed, said member being connected to said bed adjacent the center of gravity thereof, stationary cam means on said frame means, and a follower on said bed cooperating with said cam means, said cam means having one portion shaped and located to cooperate with the follower to lock said bed and member together so that said bed has one movement with said member about said axis for positioning said member and moving said seat, said cam means having another portion shaped to release said bed for another movement relative to said member about said pivotal connection therewith, for movement of said bed successively about different pivotal connections during movements thereof between raised and lowered positions above said seat.

7. A combined bed and seat comprising spaced supporting frames at opposite ends thereof, a shaft connecting said frames, a seat located between and movable on said frames, a bed located between and movable on said frames, a member mounted for pivotal movement on each end of said shaft and having pivotal connections with said seat and bed, stationary cams on said frames, and followers on said bed cooperating with said cams, said cams and followers being shaped to cooperate with each other respectively to effect one movement of said bed with said members about said shaft for moving said seat and said members, said cams having portions concentric with the connections between said members and bed in their positions at the end of the conjoint movement thereof for releasing said bed for another movement relative to said members about said pivotal connections therewith for moving said bed successively about different pivotal connections during movements thereof between raised and lowered positions above said seat.

8. A combined bed and seat comprising supporting frame means, a bed, a seat mounted on said frame, a member having pivotal connections with said frame means and bed, said member being connected with said bed adjacent the center of gravity thereof and substantially above the connection of said member and frame, cam and follower means connected to said frame and bed, respectively, and having cooperating portions shaped and located to effect one movement of said bed with said member about the pivotal connection of said member with said frame means, said cam means having a portion concentric with the connection between said bed and member in their positions at the end of the conjoint movement thereof for releasing said bed for another movement relative to said member about said pivotal connection therewith for moving said bed successively about different pivotal connections during movements thereof between raised and lowered positions above said seat while maintaining the center of gravity of said bed at substantially constant elevation, and means for locking said bed in lowered position.

9. A combined bed and seat comprising frame means, a bed, a seat mounted on said frame, a member having pivotal connections with said frame means and bed, said member being connected with said bed adjacent the center of gravity thereof and substantially above the connection of said member and frame, cam and follower means connected to said frame and bed, respectively, and having cooperating portions shaped and located to effect one movement of said bed with said member about the pivotal connection of said member with said frame means, said cam means having a portion concentric with the connection between said bed and member in their positions at the end of the conjoint movement thereof for releasing said bed for another movement relative to said member about said pivotal connection therewith for moving said bed successively about different pivotal connections during movements thereof between raised and lowered positions above said seat, means for locking said bed in lowered position over said seat while maintaining the center of gravity of said bed at substantially constant elevation, and separately operable latch means for securing said locking members against inadvertent release.

10. A combined bed and seat comprising supporting frame means, a bed, a seat mounted on said frame, a member having movable connections with said frame means and bed, said member being connected with said bed adjacent the center of gravity thereof and substantially above the connection of said member and frame, cam and follower means connected to said frame and bed, respectively, and having cooperating portions shaped and located to effect one movement of said bed with said member about the connection of said member with said frame means, said cam means having a portion concentric with the connection between said bed and member in their positions at the end of the conjoint movement thereof for releasing said bed for another movement relative to said member about said connection therewith for moving said bed successively about different connections during movements thereof between raised and lowered positions above said seat while maintaining the center of gravity of said bed at substantially constant elevation, and means for locking said bed in lowered position including a part arranged in the unlocked position of said locking means to overlie and obstruct the occupancy of said bed.

11. A combined bed and seat comprising supporting frame means, a bed, a seat mounted on said frame, a member having movable connections with said frame means and bed, means for effecting one movement of said bed with said member about the connection of said member with said frame means and another movement of said bed relative to said member about said connection therewith for moving said bed successively about different connections during movements thereof between raised and lowered positions above said seat, and means for locking said bed in lowered position provided with a bail-shaped operating part arranged while in unlocked position to overlie and obstruct the occupancy of said bed.

12. A combined bed and seat comprising supporting frame means, a bed, a seat mounted on said frame, a member having movable connections with said frame means and bed, means for effecting one movement of said bed with said member about the connection of said member with said frame means and another movement of said bed relative to said member about said connection therewith for moving said bed successively about different connections during movements thereof between raised and lowered positions above said seat, means for locking said bed in lowered position provided with a bail-shaped operating part arranged while in unlocked position to overlie and obstruct the occupancy of said bed, and separately operable latch means for securing said locking means against inadvertent release.

13. A combined bed and seat comprising supporting frames at opposite ends thereof, a shaft connecting said frames, a seat located between said frames, a bed located between said frames, a member mounted for pivotal movement on each end of said shaft and having a pivotal connection with said bed and a connection with said seat, stationary cam means on said frames, a follower on said bed, said cam means and follower having cooperating portions shaped and located to cause said bed and members to move together so that said bed has one movement with said members about said shaft to position said members and move said seat, said cam means having a portion shaped to release said bed for another movement relative to said members about said pivotal connections therewith for moving said bed successively about different pivotal connections during movements thereof between raised and lowered positions above said seat; and means for locking said bed in lowered position.

14. A combined bed and seat comprising spaced supporting frames at opposite ends thereof, a shaft connecting said frames, a seat located between said frames, a bed, a member mounted for pivotal movement on each end of said shaft and having a pivotal connection with said bed and a connection with said seat, said members being connected to said bed adjacent the center of gravity thereof, cooperating stop parts connected with said frame and members for limiting the movement of said members relative to said frame, and means comprising a cam engaged by said bed as it is moved from raised to lowered position, for effecting one movement of said bed with said members about said shaft, for engaging said stop parts for stationarily positioning said members and moving said seat, said cam having a portion concentric with said pivotal connections between said members and bed in their positions at the end of the conjoint movement thereof for releasing said bed for another movement relative to said members about said pivotal connections therewith while said members are stationarily positioned by the engagement of said stop parts, whereby movement of said bed takes place successively about said different connections during movements of said bed between raised and lowered positions thereof above said seat and the center of gravity of said bed is maintained at a substantially constant elevation, and means for locking said bed in lowered position.

15. A combined bed and seat comprising spaced supporting frames at opposite ends thereof, a shaft connecting said frames, a seat located between said frames, a bed, a member mounted for pivotal movement on each end of said shaft and having connections with said seat and bed, said members being connected with said bed adjacent the center of gravity thereof and substantially above the connection of said members and frame, stationary cam means on said frame, said cam means having a contour eccentric to said connections between said members and bed in the closed position thereof, a follower on said bed cooperating with said cam means for controlling the movements of said bed and members so that said bed has one movement with said members about said shaft for positioning said members and moving said seat and another movement relative to said members about said pivotal connections therewith for moving said bed successively about different pivotal connections during movements thereof between raised and lowered positions above said seat while maintaining the center of gravity of said bed at a substantially constant elevation, and means for locking said bed in lowered position.

16. A combined bed and seat comprising spaced supporting frames at opposite ends thereof, a shaft connecting said frames, a seat located between said frames, a bed, a member mounted for pivotal movement on each end of said shaft and having pivotal connections with said seat and bed, stationary cam means on said frame, a follower on said bed cooperating with said cam means for controlling the pivotal movements of said bed and members so that said bed has one movement with said members about said shaft for positioning said members and moving said seat and another movement relative to said members about said pivotal connections therewith for moving said bed successively about different pivotal connections during movements thereof between raised and lowered positions above said seat, means for locking said bed in lowered position having a bail-shaped operating member arranged while in unlocked position to overlie and obstruct the occupancy of said bed, and separately operable latch means for securing said locking means against inadvertent release.

17. A combined bed and seat comprising supporting frame means, a seat on said frame means, a bed, a member having movable connections with said frame means, seat and bed, said bed having one movement with said member about the connection of said member with said frame means, for positioning said member and moving said seat and having another movement relative to said member about said connection therewith for moving said bed successively about different connections during movement thereof between raised and lowered positions above said seat, a depending apron movably connected with said seat, spring means for folding said apron under said seat, and means on said frame means for causing the lowering of said apron during the movement of the seat to its upper position.

18. A combined bed and seat comprising spaced supporting frames at opposite ends thereof, a bed located between said frames, a seat located between said frames and having a position of use and a lowered position of non-use, a member on each frame having pivotal connection therewith and with said bed, cooperating stop parts connected with said frame and members, cam and follower means connecting said bed and frame, said cam means having a contour eccentric to said connections between said bed and members in the raised and closed position of said bed for restraining movement between said bed and members and effecting movement of said bed and member together about the pivotal connections of said members with said frame during a portion of the movement of said bed from raised to partially lowered position for engaging said stop parts for stationarily positioning said members, said bed having a subsequent movement to fully lowered and fully open position about said connections between said bed and said stationarily positioned members and a connection between said members and seat for moving said seat between said position of use and said lowered position.

19. A combined bed and seat comprising spaced supporting frames at opposite ends thereof, a bed located between said frames, a seat located between said frames and having a position of use and a lower position of non-use, a member on each frame having pivotal connection therewith and with said bed, said pivotal connections between said bed and members being located adjacent the center of gravity of said bed and substantially above the pivotal connections between said members and frame, cam and follower means connected to said frame and bed and having cooperating portions shaped to restrain the movement of said bed to an arc of mainly horizontal extent about the pivotal connections of said members with said frame during a portion of the movement of said bed from raised and closed position to lowered and partially open position, said cam means having a portion concentric with the connections between said bed and members at said partially opened position for releasing said follower and bed for a subsequent movement to fully lowered and open position about said connections between said bed and members, for maintaining the center of gravity of said bed at a substantially constant elevation, and a connection between said members and seat for moving said seat between said position of use and said lowered position.

20. A combined bed and seat comprising supporting frame means, a seat on said frame means, a bed on said frame means, a member having movable connections with said frame means and seat and a movable connection with said bed adjacent the center of gravity thereof, cooperating stop parts connected with said frame and member for limiting the movement of said member relative to said frame, and means comprising a cam engaged by said bed as it is moved from raised to lowered position for effecting one movement of said bed with said member about the connection of said member with said frame means, for moving said seat and engaging said stop parts to stationarily position said member, and another movement of said bed relative to said member about said connection therewith while said member is stationarily positioned by the engagement of said stop parts, for moving said bed successively about different connections during movements thereof between raised and lowered positions above said seat while maintaining the center of gravity of said bed at a substantially constant elevation.

ALBERT A. HOPEMAN, Jr.
JOHN A. BOHNSACK.

References Cited in the file of this patent

UNITED STATES PATENTS

| Number | Name | Date |
|---|---|---|
| 444,529 | Cody | Jan. 13, 1891 |
| 556,576 | Cody | Mar. 17, 1896 |
| 675,702 | Adams | June 4, 1901 |
| 730,392 | Owen | June 9, 1903 |
| 791,719 | Owen | June 6, 1905 |
| 868,000 | Owen | Oct. 15, 1907 |
| 1,006,785 | Pierce | Oct. 24, 1911 |
| 1,164,594 | Caler | Dec. 14, 1915 |
| 1,622,702 | Brown | Mar. 29, 1927 |